United States Patent [19]

Burckhardt

[11] 4,231,441

[45] Nov. 4, 1980

[54] FLOW DIVIDER VALVE ASSEMBLY

[75] Inventor: Dieter Burckhardt, Schwäbisch Gmünd, Fed. Rep. of Germany

[73] Assignee: Zahnradfabrik Friedrichshafen AG., Friedrichshafen, Fed. Rep. of Germany

[21] Appl. No.: 962,631

[22] Filed: Nov. 21, 1978

[30] Foreign Application Priority Data

Nov. 16, 1977 [DE] Fed. Rep. of Germany ....... 2751082

[51] Int. Cl.[3] ............................................ B62D 11/00

[52] U.S. Cl. .................................. 180/6.48; 137/101; 137/118; 91/532

[58] Field of Search ............... 180/6.48; 137/101, 118, 137/625.48; 91/446, 514, 532, 434; 60/395, 484, 420

[56] References Cited

U.S. PATENT DOCUMENTS

| | | | |
|---|---|---|---|
| 1,999,834 | 4/1935 | Ernst | 60/420 |
| 2,423,264 | 7/1947 | Stephens | 91/514 X |
| 2,984,985 | 5/1961 | MacMillin | 60/471 X |
| 3,195,699 | 7/1965 | Court | 137/118 X |
| 3,405,523 | 10/1968 | Adams | 60/402 |
| 4,121,601 | 10/1978 | Presley | 137/118 X |

*Primary Examiner*—William R. Cline

*Assistant Examiner*—H. Jay Spiegel

*Attorney, Agent, or Firm*—Zalkind & Shuster

[57] ABSTRACT

The ratio between flow rates of divided flow streams established by a flow divider valve is selectively changed through a manually adjustable control valve to establish in adjusted ratio that is maintained constant for any adjusted position of the control valve. The relative flow areas of throttling passages are adjusted by the control valve to establish a predetermined pressure differential causing a corresponding change in restricted flow areas through which the divided flow streams are conducted under the constant flow rate ratio.

5 Claims, 2 Drawing Figures

FLOW DIVIDER VALVE ASSEMBLY

BACKGROUND OF THE INVENTION

This invention relates to a flow divider valve assembly for a hydrostatic unit having one inlet and two distributor outlets.

Flow divider valve assemblies of the type to which the present invention relates, are well-known and generally include a valve housing provided with an operating piston valve restricting flow along divided flow paths from pressure chambers to the distributor outlets. The pressure chambers are in constant fluid communication with compensating pressure chambers to effect shift of the operating piston valve in order to maintain a constant ratio between the flow rates of the divided flow streams despite any change in differential pressure resistance. Such flow divider valve assemblies are mainly utilized for controlling the supply of fluid to two piston cylinder devices that are operating in synchronism. Synchronism is maintained by equal distribution of flow to the piston cylinders even when a change in the fluid supply stream occurs. Nevertheless, a change in the ratio between the flow rates of the divided flow streams is often desired. It is, therefore, an important object of the present invention to provide a flow stream divider valve through which a flow rate ratio may be arbitrarily selected and maintained constant independently of and despite any change in operating resistance or variation in inlet supply flow.

SUMMARY OF THE INVENTION

In accordance with the present invention, a preselected flow rate ratio between divided flow streams is maintained constant by a control valve floatingly mounted in the valve housing of the flow divider valve assembly, the control valve having an adjusting means connected to its central portion in communication with the inlet supply line. Throttling passages are located upstream of divided flow supply conduits connected to the pressure chambers of the operating piston to which the distributor outlets are connected. As a result of the control valve location upstream of the operating piston in accordance with the present invention, the desired division of flow is adjusted by means of the throttling passages. The operating piston valve will maintain the adjusted flow rate ratio constant even when a change in operating resistances occurs. Through the valve adjusting means, the position of the control valve and the flow areas of the throttling passages are adjusted. The excess fluid that does not pass through the throttle passages into the divided flow streams, is collected in chambers connected to the reservoir tank. Such collecting chambers are located at the opposing ends of the control valve.

The present invention in one application is utilized in a hydrostatic steering system for a vehicle having ground propelling means of either the track-laying type or of the traction wheel type controlled by differential speed in order to effect a steering-by-driving action. The system accordingly includes an engine driven pump to supply pressure fluid to the inlet of the flow divider valve assembly and to fluid motors receiving fluid from the distributing outlets for driving of the ground propelling means. A steering wheel or steering spindle is connected to the valve adjusting means associated with the flow divider valve assembly. In response to steering motion applied to the steering wheel by the vehicle driver, the volumetric flow of fluid to the two fluid motors is controlled by means of the flow divider valve assembly in order to vary the speeds of the ground propelling means.

An advantageous feature of the invention resides in the valve adjusting means which consists of a pin guidingly received in a longitudinal slot of the control valve in order to convert rotation of the steering wheel into the axial movement of the control valve element. The driver may thereby steer the vehicle through a steering wheel in the customary manner as in the case of regular passenger cars or trucks.

It will be appreciated, however, that the flow divider valve assembly may be applied to installations other than the steering system aforementioned within the scope of the present invention.

BRIEF DESCRIPTION OF DRAWING FIGURES

An embodiment of the invention is described hereinafter with reference to the drawing wherein.

DETAILED DESCRIPTION OF PREFERRED EMBODIMENT

Figure 2:
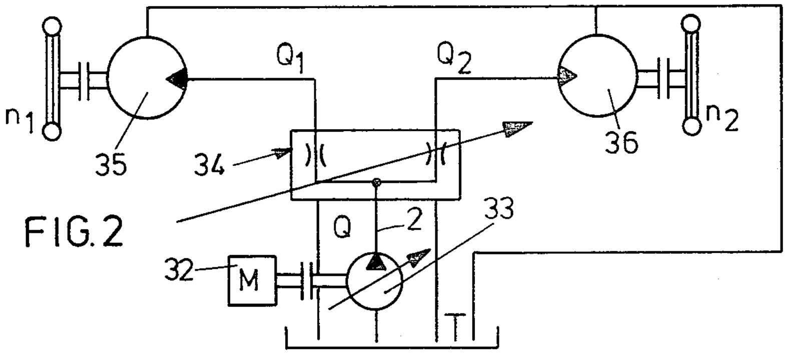
FIG. 2 is a schematic circuit diagram showing use of the flow divider valve assembly in a steering system.
Figure 1:
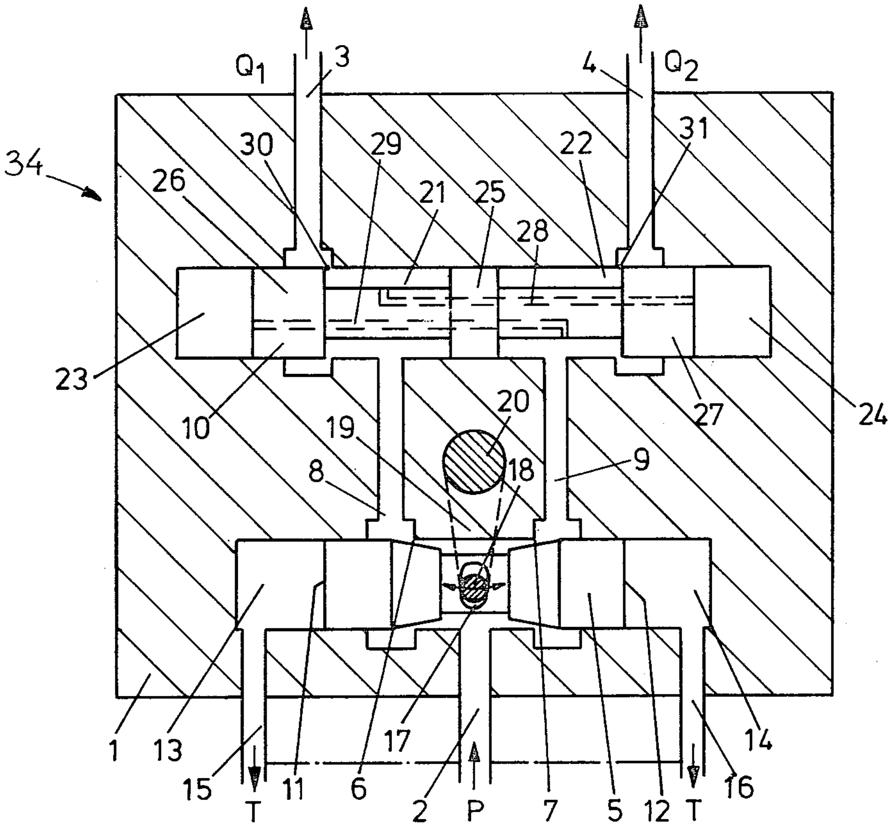
FIG. 1 is section view through a flow divider valve assembly constructed in accordance with present invention.

Referring now to the drawing in detail, FIG. 1 illustrates a flow divider valve assembly generally referred to by reference numeral 34 associated with a steering-by-driving installation as depicted in FIG. 2. According to FIG. 1, an inlet pressure line 2 conducts fluid under a volumetric flow rate Q from a pump 33 as depicted in FIG. 2 which leads to the valve housing 1 of the valve assembly from which two fluid distributor conduits 3 and 4 conduct divided flow streams $Q_1$ and $Q_2$ to locations externally of the valve assembly such as the fluid motors 35 and 36 as shown in FIG. 2.

The valve housing mounts a control valve 5 within a valve bore forming throttling passages 6 and 7 upstream of series connected supply lines 8 and 9 that extend to an operating piston device 10 through which the division of the fow stream Q into two individual divided streams $Q_1$ and $Q_2$ are controlled. The opposite end faces 11 and 12 of the control valve 5 are exposed to fluid collected in chambers 13 and 14 from which excess fluid may be exhausted to the tank by means of return lines 15 and 16.

To effect axial adjustment of the control valve 5, an elongated hole 17 is formed in the valve element within which a pin 18 is guidingly received. The pin 18 is connected by a lever 19, shown in dotted lines, to a rotatable shaft 20 which may be the steering shaft or the steering spindle. Rotation of the shaft 20 effects axial shift of the control valve 5 to change the flow area cross sections of the throttling passages 6 and 7, to change the mutual flow rate ratio of the streams $Q_1$ and $Q_2$. The operating piston divice 10 is provided in order to preserve the flow rate ratio preselected by turning of the steering shaft, even when a change in the supply stream Q occurs or when changes in the operating fluid resistance occurs. The piston device 10 has two pressure chambers 21 and 22 and two compensating chambers 23 and 24 which are separated from one another by pistons 25, 26, and 27. The pressure chamber 21 is connected by passage 28 to the compensating chamber 24 and the pressure chamber 22 by passage 29 to the compensating chamber 23. One restricted passage 30 or 31 is always established between the distributor lines 3 and 4 and the pressure chambers 21 and 22.

The divided flow streams $Q_1$ and $Q_2$ are conducted by the supply lines 8 and 9 into the pressure chambers 21 and 22 and flow through the restricted passages 30 and 31 into the distributor lines 3 and 4. The operating piston device 10 assumes a certain position depending on the flow conditions to conduct the divided streams at a constant flow rate ratio. When pressure conditions remain constant, the same pressure conditions are also prevalent in chambers 23 and 24 so that the operating piston device maintains the adjusted flow rate ratio constant. When the operating stream Q changes, the adjusted ratio also remains constant. Should the operating resistance and pressure change on one side of the valve assembly, producing, for example, a rise in pressure in distributing line 3, the resulting pressure difference between line 8 or pressure chamber 21 and the distributor line 3, reduces fluid flow in such distributor line. As a result of the changed pressure difference in the compensating chambers 23 and 24, the operating piston device 10 is shifted until the previous pressure difference is reestablished. This is occasioned by a decrease in cross-sectional flow area of the restricted passage 31 and an increase in the cross-sectional flow area of restricted passage 30. Therefore, the previous adjusted flow streams $Q_1$ and $Q_2$ continue to flow through the distributor lines 3 and 4 under the same flow rate ratio.

In order to effect recirculation of fluid through a shorter flow path than that established by return lines 15 and 16 to the tank, the return lines 15 and 16 may be directly connected by short circuit lines to the inlet pressure line 2, as indicated in FIG. 1 by a dot and dash line.

As shown in FIG. 2, a motor 32 drives the pump 33 in order to withdraw fluid from the tank for supply of fluid under pressure to the inlet line 2. The pump 33 thereby supplies fluid to the flow divider valve assembly 34 from which at least one of the fluid motors 35 or 36 is operated by the flow stream $Q_1$ or $Q_2$ in order to drive the tracks or wheels of the vehicle. The relative volumes of fluid delivered by the flow streams $Q_1$ and $Q_2$ result in the driving of the wheels or tracks at the driving speeds $n_1$ and $n_2$. By turning the hand steering wheel connected by steering shaft 20 to the valve assembly 34 as hereinbefore described, the flow of streams $Q_1$ and $Q_2$ and thereby the speeds $n_1$ and $n_2$ of the vehicle wheels are changed accordingly to steer the vehicle by driving.

What is claimed is:

1. A flow divider valve assembly having an inlet (2), distributor outlets (3 and 4), a valve housing (1) connected to the inlet and outlets, an operating piston device (10) within the valve housing including pressure chambers (21 and 22) respectively connected by restricted passages (30 and 31) to the distributor outlets, compensating chamber means (23 and 24) connected to said pressure chambers for shifting the operating piston device to maintain a constant ratio between the flow rates of the divided flow streams delivered to said distributor outlets, the improvement residing in a control valve (5) floatingly mounted in the valve housing having a central portion connected to the inlet, valve adjusting means (17-20) connected to the central portion of the control valve for displacement thereof to an adjusted position, supply conduits (8 and 9) connecting the two pressure chambers of the operating piston device to said control valve, and throttling passage means (6 and 7) located upstream of said supply conduits for conducting the divided flow of fluid from the inlet to the supply conduits.

2. The flow divider valve assembly as defined in claim 1 including discharge chamber means (13, 14) for collecting excess fluid from the throttling passage means, and opposing end faces on the control valve exposed to the fluid in said collecting chamber means.

3. The flow divider valve assembly as defined in claim 2 including short circuit means connecting the collecting chamber means to the inlet.

4. The flow divider valve assembly as defined in claim 1 or 2, in combination with a steering-by-driving system for a vehicle having ground propelling means, said system including a pump (33) connected to the inlet, a steering wheel connected to the valve adjusting means, and two fluid motors (35 and 36) respectively connected to the distributor outlets.

5. The flow divider valve assembly as defined in claim 4 wherein the valve adjusting means includes a pin (18) guidingly received in a longitudinal bore (17) formed in the control valve to convert rotation of the steering wheel into axial movement of the control valve.

* * * * *